Feb. 14, 1939.  W. H. MILLER  2,147,494
HOSE PROTECTOR
Filed April 15, 1937
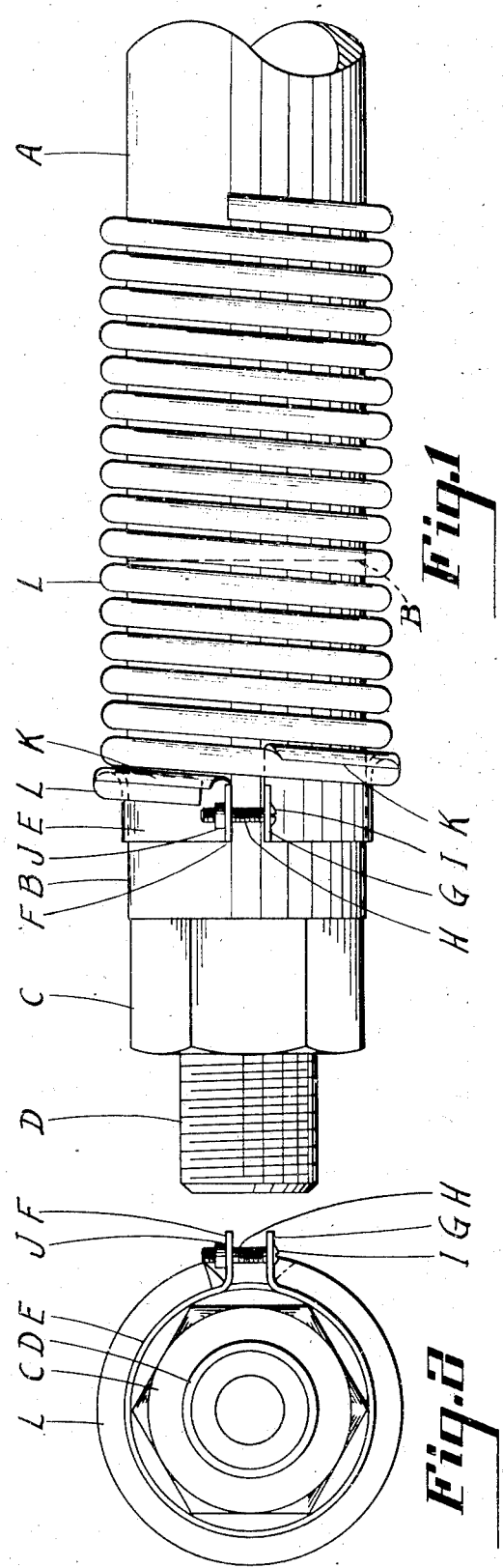
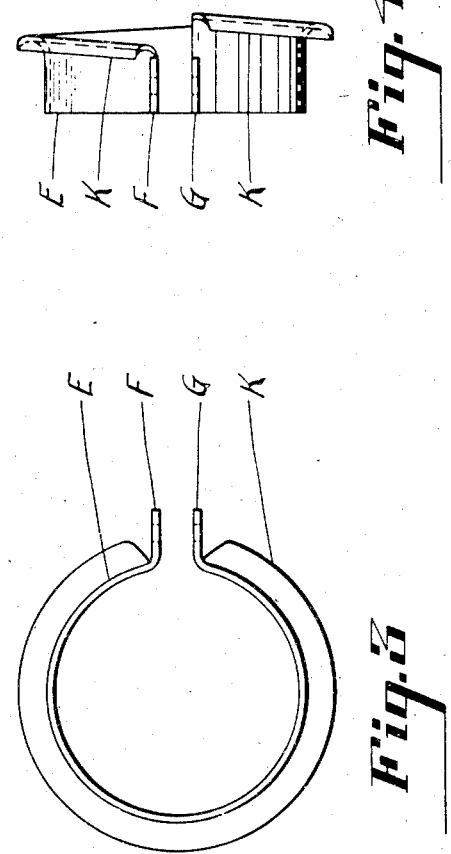
INVENTOR
WILLIAM H. MILLER
BY
ATTORNEY Patented Feb. 14, 1939

2,147,494

UNITED STATES PATENT OFFICE 2,147,494

HOSE PROTECTOR

William H. Miller, Royal Oak, Mich., assignor to John L. Ward and Richard De Tamble, partners, doing business as The Flex-O-Tube Company, Detroit, Mich.

Application April 15, 1937, Serial No. 137,104

1 Claim. (Cl. 138—61)

This invention relates to means and method of securing a wire wrapping on a hose.

The object of this invention is to secure to a hose a spiral wrapping of wire which strengthens or reinforces the hose. This means embraces a band clamped or secured around the hose, and having spiral portions which receive one or more coils of the wire, yet without preventing the flexibility and freedom of the hose to bend when in use or without hindering the wire from properly functioning as a reinforcement of the hose to prevent its bursting.

The method branch of this invention will be set forth hereinafter in this specification.

In the accompanying drawing,

Figure 1 is a side elevation of a piece of hose, on which my invention is shown mounted.

Figure 2 is an end view of the hose and its parts, showing in elevation the device which maintains the wire in its place on the hose.

Figure 3 is a like elevation of said device, disassociated from any of the other parts.

Figure 4 is a side elevation of this fastening device.

In the drawing, A shows a section of ordinary so-called rubber hose. A metal band B is shown on that end of the hose where a coupling is seen at parts C and D. The band B is secured on the hose in any convenient way. The portion C is fashioned after the shape of a threaded nut, but as a matter of fact, in this sample, it is integral with the band B, and so is the threaded projection D integral with the parts B and C. The threaded extension D is one member of any selected coupling attached to the next section of the hose, or adapted to be engaged through its threads with any object it may be desired to couple the hose to.

This hose is designed to be used where high pressure or strains of the contents of the hose tends to disrupt the hose itself. To prevent that, the hose in question is protected by a wrapping of yieldable wire in a spiral form, and which wrapping will be as flexible as the hose itself and yet will afford enormous strength by which to protect the hose from the pressure on the inside.

The special feature which embodies this invention is shown at E and comprises a collar of metal which is mounted on the band B and is secured by a bolt connection extending from the tongue F to the end G of the collar. The nut H has a head at one end I and a nut J at the other end. By these means the collar is easily applied to and removed from the band B or from the rubber hose if applied directly to it. One or more portions K of the collar G are folded over to form a sort of gutter or seat in which the adjacent coil of the wire is placed. The collar can be revolved before being drawn tight by the bolt to screw it on the adjacent parts of the wire which are spiral.

In Figure 1, a part of the first coil, marked L, is thus fitted in the partially tubular portion K of the collar and further along in this same coil of wire, a portion of it is threaded or placed within the other portion K of the collar.

Thus the wire coil at one end is anchored to the hose through the medium of the collar E, and its overturned portions which are preferably spirally positioned to agree with the spiral position of the adjacent coils of the wire. But I wish it to be understood that the essence of this part of my invention lies in the fixed parts with which the wire is engaged or held against any strain that would tend to dislodge the wire longitudinally from the axis of the hose.

The collar described affords a practical and useful means of securing these fixed parts by which the spiral wire is anchored to the hose. These turned-over portions K are really anchors which when engaged by the wire act to maintain it in any desired position on the hose.

The steps of the method of this invention consist in: (a) fabricating a collar adapted to fit on the hose and adapted to be tightened either directly on the hose or on an intervening band, itself also clamping the hose; (b) in fabricating on the collar, flanges spirally positioned and functioning as anchors; and (c) fabricating a coil spring adapted to fit over the hose and reinforce its strength against inward pressure within the hose, with the end of the coil spring adjacent the collar arranged to be seated on or within the spiral flanges or anchors to prevent the spiral wire wrapper on the hose from any movement bodily back and forth with respect to the hose.

By these steps in the manipulation of the physical things referred to, a complete and highly desirable assemblage of cooperating parts is produced.

I desire to comprehend within my invention such modifications as may be embraced within the claim and the scope of the invention.

Having thus fully described my invention, what I claim is new and desire to secure by Letters Patent, is:

In a device of the character described, a hose, a collar adapted to fit on the hose and having means for tightening it about the hose, the collar having an edge bent rearwardly upon itself to form a transversely curved rearwardly facing groove, of spiral form from end to end, to receive and anchor the end portion of a spiral spring, a spiral spring adapted to fit over the hose and reinforce it against outward pressure from within, the end portion of the spiral coil spring fitting within the curved rearwardly bent edge portion of the collar to anchor the end of the spiral spring on the hose against longitudinal and radial movement relatively to the hose, the collar being progressively increased in width from one end of the curved groove to the other end of said groove.

WILLIAM H. MILLER.